US008699546B2

(12) United States Patent
Jonsson et al.

(10) Patent No.: US 8,699,546 B2
(45) Date of Patent: Apr. 15, 2014

(54) BLIND DETECTION OF MODULATION CONFIGURATION FOR INTERFERING SIGNALS

(75) Inventors: Elias Jonsson, Malmö (SE); Kazuyoshi Uesaka, Kawasaki (JP)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 13/452,399

(22) Filed: Apr. 20, 2012

(65) Prior Publication Data
US 2013/0279547 A1 Oct. 24, 2013

(51) Int. Cl.
*H04B 1/00* (2006.01)
(52) U.S. Cl.
USPC .......................................... 375/148; 375/147
(58) Field of Classification Search
USPC ................... 375/148, 147, 140, 130
See application file for complete search history.

(56) References Cited

U.S. PATENT DOCUMENTS

| 2005/0099992 | A1* | 5/2005 | Sato ............................... 370/350 |
| 2005/0130592 | A1* | 6/2005 | Dowling ........................ 455/63.1 |
| 2010/0260231 | A1 | 10/2010 | Ringstom et al. |
| 2011/0173508 | A1* | 7/2011 | Wehinger ....................... 714/748 |

FOREIGN PATENT DOCUMENTS

| WO | 0150615 A2 | 7/2001 |
| WO | 2011061721 A1 | 5/2011 |

OTHER PUBLICATIONS

Jonsson, E. et al. "Method and Apparatus for Identifying Other User Equipment Operating in a Wireless Communication Network." Co-pending U.S. Appl. No. 13/291,900, filed Nov. 8, 2011.

Rong, Zeng. "Channel Estimation Aided Active Codes Detection Algorithm in TD-SCDMA Systems." International Conference on Communications and Mobile Computing, 2009. pp. 229-233. IEEE. Piscataway, NJ.
Saadani A. et al., "An Hybrid PIC Based Receiver Using Code Estimation for HSDPA Multiuser Interference Cancellation." IEEE 16th International Symposium on Personal, Indoor and Mobile Radio Communications, 2005. pp. 2400-2404. IEEE. Piscataway, NJ.
3GPP. "3rd Generation Partnership Project; Technical Specification Group Radio Access Network; Multiplexing and Channel Coding (FDD) (Release 11)." 3GPP TS 25.212 V11.1.0. Mar. 2012. Section 4.6.1-4.6.2. pp. 64-87.
Korhonen, I.J. Wassell. "Low Complexity Interference Reduction for MIMO Enabled CDMA Mobile Receivers." Vehicular Technology Conference, 2005. IEEE 62nd. Dallas, TX. IEEE 2005 vol. 1, pp. 93-97.
3GPP. "Midamble Allocation and Channelisation Code Allocation Signalling to Support MIMO in UTRA TDD." 3GPP TSG RAN WG1#37. R1-040580. Montreal, Canada. May 10-14, 2004. pp. 1-7.
Reddy et al. "An Efficient Blind Modulation Detection Algorithm for Adaptive OFDM Systems." Vehicular Technology Conference, 2003. IEEE 58th, Orlando, FL, 2003. vol. 3, pp. 1895-1899.

* cited by examiner

Primary Examiner — Chieh M Fan
Assistant Examiner — Brian J Stevens
(74) Attorney, Agent, or Firm — Murphy, Bilak & Homiller, PLLC (57) ABSTRACT

Techniques are disclosed for determining which channelization codes are used for an interfering HS-PDSCH transmission without knowing whether a neighboring UE targeted by that transmission has had its 64QAM capability activated by higher layer signaling. The average amplitude is measured for each of several possible groups of channelization codes for each of one or more nearby UEs that might be the targets of interfering HS-PDSCH messages. Testing whether the amplitude is approximately the same across the codes in a possible combination of channelization codes yields a metric value that indicates whether that particular combination of codes is likely to be transmitted to a given UE. A second metric that detects the most likely modulation for possible groups of channelization codes is also calculated. The metrics are combined to determine which combination of channelization codes and modulation scheme is most likely being used for addressing the neighboring UE.

18 Claims, 5 Drawing Sheets

BLIND DETECTION OF MODULATION CONFIGURATION FOR INTERFERING SIGNALS

BACKGROUND

The present invention generally relates to wireless communications receivers, and more particularly relates to techniques for determining the modulation formats and channelization codes used by interfering radio signals.

In today's advanced wireless systems, both the uplink (mobile terminal-to-base station communications) and downlink (base station-to-mobile terminal communications) are subject to various sources of interference, including, for example, intra-cell interference arising from a lack of complete orthogonality between user signals within a wireless system cell, inter-cell interference arising from signals intended for users or originating from users in other cells, and thermal noise. To combat these interference sources, interference cancellation techniques are increasingly being deployed.

One category of interference cancellation techniques is known as decoder interference cancellation (IC) or post-decoder interference cancellation. The general idea behind decoder interference cancellation is that a signal generated using decoder output from a first decoding attempt is subtracted from the input signal before a second decoding attempt. The decoder output from the first decoding attempt could relate to an unwanted signal, for the purpose of cancellation.

Figure 1:
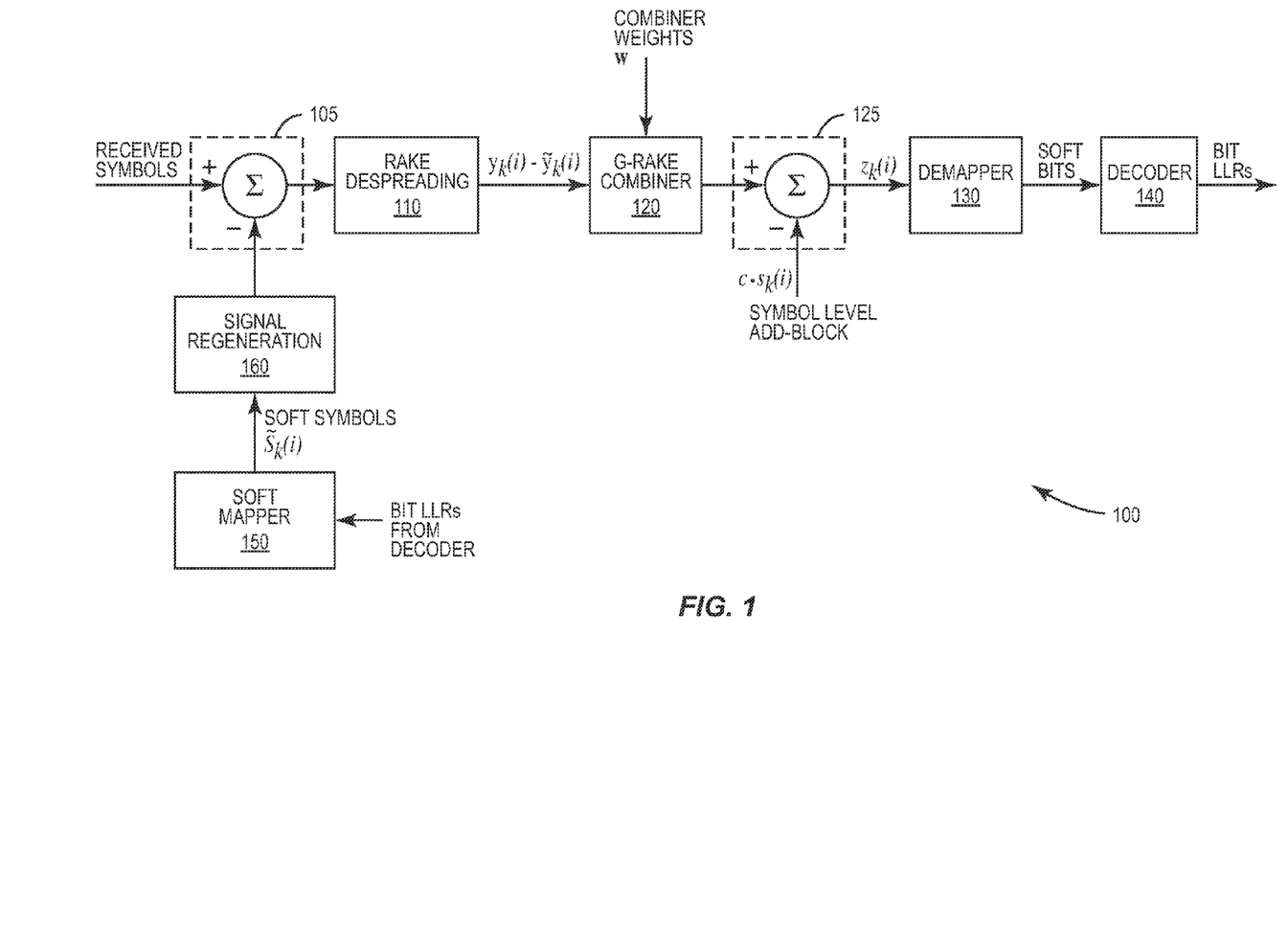
FIG. 1 is a block diagram illustrating an example interference cancelling receiver.

FIG. 1 illustrates an example of an interference cancelling receiver 100 that uses output from a decoder to perform interference cancellation. This receiver system is sometimes referred to as a Turbo interference cancellation receiver. In the example figure, a so-called RAKE receiver is shown, which indicates a Wideband Code-Division Multiple Access (W-CDMA) application of decoder interference cancellation.

As can be seen in FIG. 1, the output of the decoder 140 produces log-likelihood ratios (LLR), which are essentially estimated probabilities that the corresponding decoded information bits should be set to one or zero. For interference cancellation purposes, the LLRs are used by soft mapper 150 to generate the symbol values that were most likely to have been transmitted by another node, such as a base station when the receiver is in a wireless terminal. An estimate of the received signal corresponding to these symbol values is produced by signal regenerator 160, which applies the same modulation and scrambling that was removed from the signal by RAKE despreader 110 and demapper 130 in the first decoding iteration. Then, the regenerated signal from signal regenerator 160 is subtracted from the original input signal, using subtracter 105, to produce an interference-reduced signal. At the output of the RAKE despreader 110, the contribution to the despread signal from the original received signal (for a given code) is denoted $y_k(i)$ and the contribution from the subtracted signal is denoted as $\tilde{y}_k(i)$, where i is the symbol index and k the channelization code.

An equalizer, illustrated as a G-RAKE combiner 120 in FIG. 1, applies equalizer weights to the despread signal to reduce the effects of multipath propagation. The equalizer weights, or G-RAKE weights, since the weights are applied after the RAKE, are denoted w. The resulting equalized, despread, symbol samples are then demapped, by demapper 130, to convert them from soft symbols to soft bits.

After demapping from soft symbols to soft bits by demapper 130, decoding is performed by decoder 140, which produces a new (and improved) set of probabilities (LLR) for the transmitted bits. The above procedure could be repeated as many times as desired, subject to limitations on processing power available in the receiver, limitations on latency, etc. Of course, this iterative process might also be terminated when the remaining errors in the decoded bits fall below a target level.

In a High-Speed Downlink Packet Access (HSDPA) link, part of the interference to the desired downlink signal at the wireless terminal arises from High-Speed Physical Downlink Shared Channel (HS-PDSCH) transmissions to other wireless terminals, whether these signals are transmitted from the same transmission points as the desired signal or from neighboring transmission points. These interfering HS-PDSCH transmissions can be at least partly cancelled if the channelization codes and modulation schemes used for these interfering signals are known.

If identifiers for other wireless terminals (user equipment, or UEs, in 3GPP terminology) in the vicinity of a wireless terminal of interest are known, then it is possible to decode scheduling messages sent to these UEs via High-Speed Shared Control Channel messages. These scheduling messages carry information that at least partly defines the channelization codes and modulation schemes to be used in subsequent HS-PDSCH transmissions to that UE. The UE identifier for the targeted UE is used to mask the HS-SCCH messages, which makes it necessary to know the UE identifier to properly decode the HS-SCCH message.

However, even if a receiver knows the UE identifiers for neighboring UEs and is thus able to successfully decode HS-SCCH messages corresponding to interfering HS-PDSCH transmissions, some obstacles remain. One problem is that the HS-SCCH message cannot be interpreted properly unless the receiving unit knows whether the UE targeted by the HS-SCCH has been configured to support 64-QAM operation. This configuration is performed through signaling at higher layers, and it is nearly impossible for a UE other than the one targeted by the configuration message to intercept it. Because the data fields in the HS-SCCH are interpreted differently depending on whether or not 64-QAM operation is configured, a UE eavesdropping on HS-SCCH messages intended for other UEs is still unable to determine the channelization codes and modulation schemes used for HS-PDSCH messages to those UEs from the contents of the HS-SCCH alone. Without knowledge of the channelization codes and modulation schemes used for the interfering HS-PDSCH transmissions, the UE is unable to decode and regenerate the interfering signals as needed to perform interference cancellation.

U.S. Patent Application Publication No. 2010/0260231 describes a method for blind detection of a transport format of a signal, and discloses techniques for reducing the number of transport format hypotheses to be considered in the blind detection. Additional techniques are needed to determine the channelization codes and modulation scheme for interfering HS-PDSCH transmissions.

SUMMARY

For a given set of channelization code-set bits in an HS-SCCH message, the actual channelization codes used for the HS-PDSCH depend on whether or not 64QAM configuration has been signaled to the target wireless terminal. Accordingly, techniques are needed for determining which channelization codes are used for an interfering HS-PDSCH transmission without knowing whether the UE targeted by that transmission has had its 64QAM capability activated by higher layer signaling.

In several embodiments of the present invention, this is accomplished by measuring the amplitude on each of several possible groups of channelization codes for each of one or more nearby UEs that might be the targets of interfering HS-PDSCH messages. Testing to see whether the amplitude is approximately the same across the codes in a possible combination of channelization codes yields a metric value that indicates whether that particular combination of codes is likely to be transmitted to a given UE. A second metric that detects the most likely modulation for possible groups of channelization codes is also calculated. The two metrics are combined to determine which combination of channelization codes and modulation scheme is most likely being used for addressing a UE in the vicinity of an interference-cancelling receiver.

An example method according to some embodiments of the invention begins with the reading of downlink order data for each of one or more neighboring wireless terminals from a downlink control channel. The downlink order data specifies an assignment of one or more channelization codes and a modulation scheme for the corresponding neighboring wireless terminal, where each assignment depending on the downlink order data and an unknown modulation configuration parameter previously sent to the corresponding neighboring wireless terminal. In an HSDPA system the downlink order data is read from an HS-SCCH scheduling message targeted to the neighboring wireless terminal and the unknown modulation configuration parameter is the 64QAM configuration status of the wireless terminal.

Next, all possible combinations of channelization codes and modulation schemes for all of the neighboring wireless terminals are identified, taking into account possible values for the unknown modulation configuration parameter. In the HSDPA example, two possible interpretations for each downlink order data are possible, given the two possible 64QAM configuration states. The possible combinations of channelization codes and modulation schemes should also take into account that no two wireless terminals are assigned the same channelization codes. Thus, some combinations of interpretations of the downlink order for the various wireless terminals will result in code allocations that are not possible—these combinations can be eliminated from the set of possible hypotheses for wireless terminal/channelization-code/modulation-scheme arrangements.

For each possible combination, a code-power consistency metric is then calculated for each of the neighboring wireless terminal. This code-power consistency metric indicates the probability that all of the channelization codes corresponding to the wireless terminal in a given combination are transmitted with the same power, and is based on despread data samples corresponding to the channelization codes for the respective wireless terminal, given the channelization code allocation for the combination under consideration. In some cases, the code-power consistency metric for each of the neighboring wireless terminals is further based on a filtered average of values for the unknown modulation configuration parameter determined from previous most likely combinations.

Similarly, a modulation-matching metric is calculated for each of the neighboring wireless terminals, for each of the possible combinations. Again, this modulation-matching metric is based on received despread data samples corresponding to the channelization codes. The modulation-matching metric indicates how closely the received symbols match a constellation pattern for one of the possible modulation schemes. In the example calculation described in detail above, the modulation-matching metric for each of the neighboring wireless terminals for a given possible combination is calculated, for each neighboring wireless terminal and its corresponding channelization codes, by comparing despread samples for the corresponding channelization codes to an assumed map of constellation points and calculating a fraction of despread samples that fall outside defined windows centered on each constellation point. In some cases, the modulation-matching metric corresponds to the most likely modulation scheme for the wireless terminal, given a possible allocation of channelization codes. In other cases, however, the modulation-matching metric for each of the neighboring wireless terminals is calculated based on assumed modulation schemes for each of the neighboring wireless terminals, where the assumed modulation schemes are determined from the current assumed values for the unknown modulation configuration parameter.

Finally, a most likely one of the possible combinations is identified. This is done using a weighted sum of the code-power consistency metrics and modulation-matching metrics for each possible combination.

The technique summarized above is of particular use in an interference-cancelling receiver, as the channelization code and modulation scheme information can be used to demodulate traffic data transmitted to the neighboring terminals, e.g., HSDPA transmissions in an HSDPA system. Accordingly, the operations summarized above may in some cases be followed by the forming of a reconstructed estimate of interfering signals corresponding to one or more of the neighboring wireless terminals, based on corresponding channelization codes and modulation schemes determined from the most likely one of the possible combinations. Interference cancellation can then be using the reconstructed estimate.

The techniques described above can be implemented in a receiver circuit. Accordingly, further embodiments of the invention include a modulation configuration detection circuit configured to carry out one or more of these techniques. This modulation configuration detection circuit might be used, for example, to augment an interference-cancelling receiver, thus enabling the receiver to regenerate and cancel interfering signals targeted to neighboring wireless terminals.

One embodiment of such a modulation configuration detection circuit includes a HS-SCCH message decoder, which reads and interprets downlink assignment messages for neighboring wireless terminals. The downlink order data included in these messages specify an assignment of one or more channelization codes and a modulation scheme for the targeted wireless terminal, but the proper interpretation of the order data depends on whether or not the wireless terminal is configured for 64QAM operation, which is normally unknown to other receivers. The modulation configuration detection circuit further includes a hypothesis generator, which identifies all possible combinations of channelization codes and modulation schemes for all of the neighboring wireless terminals, taking into account possible values for the unknown modulation configuration parameter and that no two wireless terminals are assigned the same channelization codes. A metric generator calculates two metrics for each of the neighboring wireless terminals, for each possible combination: a code-power consistency metric and a modulation-matching metric. These metrics are based on despread data samples corresponding to the channelization codes for each wireless terminal, for each possible combination of channelization code and modulation scheme allocations. Detailed examples of these calculations were given above. Finally, a channelization code and modulation identifier identifies a most likely one of the possible combinations, using a weighted sum of the code-power consistency metrics and modulation-matching metrics for each possible combination. This information is supplied to demodulation circuits so that the corresponding HS-PDSCH transmissions to the neighboring wireless terminals can be demodulated, regenerated, and cancelled from the received signal.

A modulation configuration detection of the sort summarized above can be implemented in a processor circuit configured with software instructions for carrying out one or more of the detailed techniques disclosed herein. This processor circuit can be combined with other receiver circuits, such as in an interference-canceling receiver. Thus, still further embodiments of the invention include a receiver circuit configured to identify channelization codes and modulation schemes for interfering signals targeted to neighboring wireless terminals. The receiver circuit in several of these embodiments includes a despreading circuit configured to generate despread data samples for each of a plurality of channelization codes and a demodulation and decoder circuit configured to decode downlink order data from a downlink control channel, for each of one or more neighboring wireless terminals. The receiver circuit in these embodiments further includes a processing circuit configured to read the corresponding downlink order data for each of the one or more neighboring wireless terminals, the downlink order data specifying an assignment of one or more channelization codes and a modulation scheme for the corresponding neighboring wireless terminal, each assignment depending on the downlink order data and an unknown modulation configuration parameter previously sent to the corresponding neighboring wireless terminal. The processing circuit is further configured to identify all possible combinations of channelization codes and modulation schemes for all of the neighboring wireless terminals, taking into account possible values for the unknown modulation configuration parameter and that no two wireless terminals are assigned the same channelization codes and to calculate a code-power consistency metric for each of the neighboring wireless terminals, for each possible combination, based on despread data samples corresponding to the channelization codes. The processing circuit is also configured to calculate a modulation-matching metric for each of the neighboring wireless terminals, for each possible combination, based on received despread data samples corresponding to the channelization codes and to identify a most likely one of the possible combinations, using a weighted sum of the code-power consistency metrics and modulation-matching metrics for each possible combination.

The methods and circuits summarized above can be used to improve interference cancellation performance in an interference-cancelling receiver, for example. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

The invention is described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Thus, components or features from one embodiment may be assumed to be present or used in another embodiment, where such inclusion is suitable.

For purposes of illustration and explanation only, these and other embodiments of the present invention are described herein in the context of operating in a radio access network (RAN) that communicates over radio communication channels with wireless terminals (also referred to as user equipment, or "UEs"). More particularly, specific embodiments are described in the context of systems using Wideband Code-Division Multiple Access (W-CDMA) technology and/or High-Speed Downlink Packet Access (HSDPA) technology, as standardized by the membership of the $3^{rd}$ Generation Partnership Project (3GPP). It will be understood, however, that the present invention is not limited to such embodiments and may be embodied generally in various types of communication networks. As used herein, the terms mobile terminal, wireless terminal, or UE can refer to any device that receives data from a communication network, and may include, but are not limited to, a mobile telephone ("cellular" telephone), laptop/portable computer, pocket computer, hand-held computer, and/or desktop computer.

Also note that the use of terminology such as "base station" (which may be referred to in various contexts as NodeB, for example) and "wireless terminal," "mobile terminal," or "wireless device" (often referred to as "UE" or "User Equipment") should be considering non-limiting and does not necessarily imply a certain hierarchical relation between two particular nodes of a communication link. In general, a base station (e.g., a "NodeB") and a wireless terminal (e.g., a "UE") may be considered as examples of respective different communications devices that communicate with each other over a wireless radio channel. While embodiments discussed herein may focus on wireless transmissions in a downlink from a NodeB to a UE, the inventive techniques may also be applied, for example, to uplink transmissions in some contexts. As a result, several embodiments of the invention described in detail below, including modified versions of the receiver circuit 100 pictured in FIG. 1, may be suitable for use in various wireless terminals, base stations, or both. It will be appreciated, of course, that the details of accompanying circuitry, including antennas, antenna interface circuits, radio-frequency circuits, and other control and base band circuits, will vary, depending on the specific application of the inventive techniques disclosed herein. Because these details are not necessary to a complete understanding of the present invention, those details are generally omitted in the following discussion and in the accompanying figures.

As suggested above, the suppression and/or removal of interfering signals is fundamental to improving the coverage and throughput of advanced wireless systems. In an HSDPA system, cancelling of interfering HS-PDSCH transmissions is particularly beneficial. To do this well, however, the interference-cancelling receiver must be able to decode the interfering HS-PDSCH transmissions, which means that it must know the codes used to spread and scramble the signals as well as the modulation schemes used to map the transmitted data to the signals. The interference-cancelling receiver can obtain some of this information by intercepting and decoding scheduling messages sent to the targets of the interfering signals, which are carried in High-Speed Shared Control Channel (HS-SCCH) transmissions.

HS-SCCH messages are masked, using an identifier for the target UE. In the discussion that follows it is assumed that a list of potential UE IDs in the neighborhood of the UE is already known. Several approaches for learning the identity of neighboring UEs are described in co-pending U.S. patent application Ser. No. 13/291,900, filed on 8 Nov. 2011 and titled "A Method and Apparatus for Identifying Other User Equipment Operating in a Wireless Communication Network," the entire contents of which are incorporated herein by reference. The known UE identifiers are used to test whether a transmission to any of them is scheduled in any given transmission time interval (TTI). This is done by testing the different UE identifiers against the transmitted HS-SCCH, i.e., by unmasking the HS-SCCH transmissions using the UE identifiers and testing whether the unmasked HS-SCCH part 1 messages decode properly.

The first slot of the three slot HS-SCCH transmission, i.e., the HS-SCCH Part 1 message, carries the most time-critical part of the scheduling information needed to prepare a targeted receiver to demodulate and decode a subsequent HS-PDSCH transmitted to that receiver. The parameters carried by the HS-SCCH Part 1 message specifically identify the codes to despread, as well as a parameter to indicate which modulation scheme is to be applied to the HS-PDSCH transmission.

Prior to the introduction of support for 64QAM, the parameters carried by the HS-SCCH Part 1 message unambiguously specified the codes to be despread and whether the signals were modulated with Quadrature Phase-Shift Keying (QPSK) or 16-QAM (Quadrature Amplitude Modulation). However, subsequent to the release of 64QAM support, those same parameters take on different meanings if the target UE is configured by the network to anticipate 64QAM modulation as a possibility.

As noted earlier, this configuration is performed using higher level signaling. Accordingly, a receiver eavesdropping on HS-SCCH transmissions intended for another UE generally does not know whether that other UE has been configured for 64QAM. This signaling of 64QAM configuration for a particular UE does not mean that all subsequent HS-PDSCH transmissions are performed using 64QAM. Rather, it only opens the possibility for a transmission with 64QAM modulation. However, because this configuration changes the manner in which the HS-SCCH Part 1 messages are interpreted, an eavesdropping receiver cannot properly interpret the HS-SCCH parameters, even if it properly unmasks and decodes the HS-SCCH Part 1 message. Without the scheduling information carried by the HS-SCCH, of course, an interference-cancelling receiver cannot demodulate and decode interfering HS-PDSCH transmissions to perform subtractive interference cancellation.

The 3$^{rd}$-Generation Partnership Project (3GPP) specification 3GPP TS 25.212 describes the proper formation of the HS-SCCH parameters that indicate the modulation scheme and channelization code set to be used. First, Section 4.6.2.2 of this specification defines a modulation scheme parameter as follows:

$$X_{ms,1} = \begin{cases} 0 & \text{if } QPSK \\ 1 & \text{otherwise} \end{cases}.$$

Note that "otherwise" refers to 16QAM modulation if the targeted UE is not configured for 64QAM operation. If the targeted UE is configured for 64QAM, on the other hand, then "otherwise" includes both 16QAM and 64QAM as possibilities.

Next, Section 4.6.2.3 of 3GPP TS 25.212 defines the coding for seven channelization code-set bits to be transmitted on the HS-SCCH. These channelization code-set bits need to identify P channelization codes, starting at a code O. The coding of the channelization code-set bits thus depends on P and O, as well as on an HS-SCCH number, in some cases. These parameters are defined in detail by the 3GPP specifications.

The first three of the channelization code-set bits are:

$xccs,1,xccs,2,xccs,3 = \min(P-1,15-P)$

If 64QAM is not configured for the UE, or if 64QAM is configured and the modulation scheme parameter xms,1 is equal to 0, then the last four bits are given by:

$xccs,4,xccs,5,xccs,6,xccs,7 = |O-1-\lfloor P/8 \rfloor *15|.$

Otherwise (i.e., if 64QAM is configured for the UE and xms,1=1), then:

P and O shall fulfil $|O-1-\lfloor P/8 \rfloor *15|$mod 2=(HS-SCCH number) mod 2, and:

$xccs,4,xccs,5,xccs,6,xccs,\text{dummy} = |O-1-\lfloor P/8 \rfloor *15|,$ where xccs,dummy is a dummy bit that is not transmitted on HS-SCCH. Furthermore, if 64QAM is configured for the UE and xms,1=1, then:

$$X_{ccs,7} = \begin{cases} 0 & \text{if } 16QAM \\ 1 & \text{if } 64QAM \end{cases}.$$

In effect, the dummy bit xccs,dummy is replaced with a bit that indicates whether 16QAM or 64QAM is used, in the event that the UE is configured for 64QAM and a modulation other than QPSK is scheduled.

From the above summary describing a portion of the HS-SCCH Part 1 message coding, it can be seen that for a given set of channelization code-set bits, the actual channelization codes used by the HS-PDSCH depend on whether or not 64QAM configuration has been being signaled to the targeted UE. Accordingly, techniques are needed for determining which channelization codes are used for an interfering HS-PDSCH transmission without knowing whether the UE targeted by that transmission has had its 64QAM capability activated by higher layer signaling.

In several embodiments of the present invention, this is accomplished by measuring the amplitude on each of several possible groups of channelization codes for each of one or more nearby UEs that might be the targets of interfering HS-PDSCH messages. Testing to see whether the amplitude is approximately the same across the codes in a possible combination of channelization codes yields a metric value that indicates whether that particular combination of codes is likely to be transmitted to a given UE. A second metric that detects the most likely modulation for possible groups of channelization codes is also calculated. The two metrics are combined to determine which combination of channelization codes and modulation scheme is most likely being used for addressing a UE in the vicinity of an interference-cancelling receiver.

As discussed briefly above, the idea behind decoder interference cancellation is to subtract from the input signal a signal generated using decoder output from a prior decoding attempt. In the present context, the decoder output relates to HS-PDSCH from other UEs. The output of the decoder produces log-likelihood ratios (LLR), which essentially represent probabilities that a given bit was set to one or zero by the transmitting node. The LLRs are used to generate probable symbol values as transmitted by the base station. The regenerated symbol values are then subjected to the same modulation and scrambling that was performed by the transmitting node, and then the resulting regenerated interfering signal estimate is subtracted from the input signal.

Referring to FIG. 1 once again, it can be seen that the regenerated signal from signal regenerator 160 is subtracted from the original input signal, using subtracter 105, to produce an interference-reduced signal. At the output of the RAKE despreader 110, the contribution to the despread signal from the original received signal (for a given code) is denoted $y_k(i)$ and the contribution from the subtracted signal is denoted as $\tilde{y}_k(i)$, where i is the symbol index and k the channelization code. An equalizer, illustrated as a G-RAKE combiner 120 in FIG. 1, applies equalizer weights to the despread signal to reduce the effects of multipath propagation. The equalizer weights, or G-RAKE weights, since the weights are applied after the RAKE, are denoted w. The resulting equalized, despread, symbol samples are then demapped, by demapper 130, to convert them from soft symbols to soft bits.

For a HS-PDSCH transmitted on channelization code k, the average amplitude $d^{(k)}(n_s)$ over a slot of 160 symbols can be calculated according to:

$$d^{(k)}(n_s) = \frac{1}{2 \times 160} \sum_{i=0}^{159} (|\operatorname{Re} z_k(i)| + |\operatorname{Im} z_k(i)|). \quad (1)$$

Here, the index i enumerates the symbols in time, and $n_s$ is the slot number. Further filtering of $d^{(k)}(n_s)$ is also possible, both in time and across channelization codes that are known to have been transmitted with the same data amplitude. In a WCDMA system, modulation and the power of the HS-PDSCH is the same across all codes destined for a given UE. Thus, the amplitude estimated in Equation (1) should be the same for all codes used to transmit HS-PDSCH to a given UE.

An average symbol amplitude estimate is the starting point for the computation of a metric that can be used to determine which of several modulation schemes was most likely used to transmit a series of symbols for a given channelization code or group of channelization codes. For the purposes of this discussion, this metric will be called a "modulation-matching metric." In the HSDPA context under discussion here, for example, this modulation-matching metric can be used to detect which of the possible modulation schemes, i.e., QPSK, 16QAM, or 64QAM, is most likely being used.

When computing this modulation-matching metric for a group of channelization codes, it is assumed that all of the spread signals were transmitted with the same amplitude and using the same modulation scheme. As noted above, this will be true in an HSDPA system if the channelization codes under scrutiny were used to send data to a single UE.

The modulation-matching metric computation begins with an estimation of the average real and imaginary symbol amplitudes for despread symbols $z_k(i)$ obtained from all the channelization codes in the code set of interest. A calculation like that shown in Equation (1) may be used, for example. The resulting amplitude estimate is used to locate where the constellation points are in the I-Q diagram of the constellation map for the corresponding modulation scheme. If the despread symbols come from several channelization codes, the symbols can be assumed to have been transmitted with the same power, and the amplitude estimate may be averaged across the codes.

Figure 2:
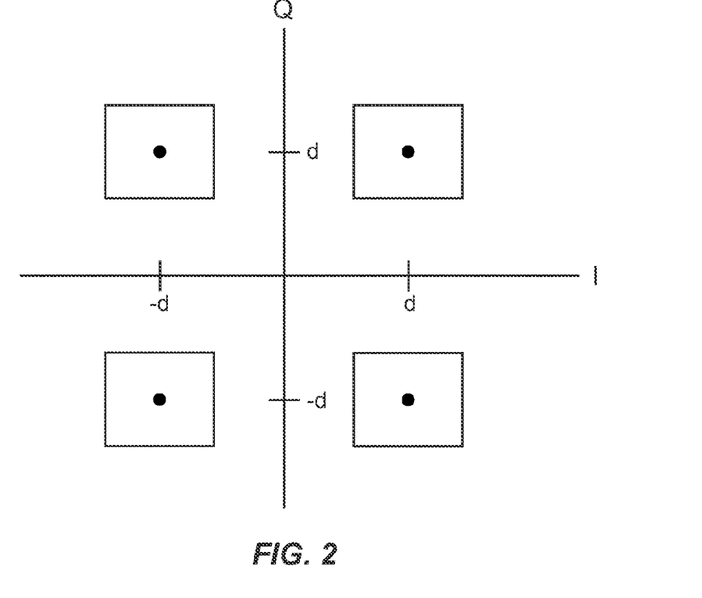
FIG. 2 illustrates the constellation pattern for QPSK modulation.
Figure 3:
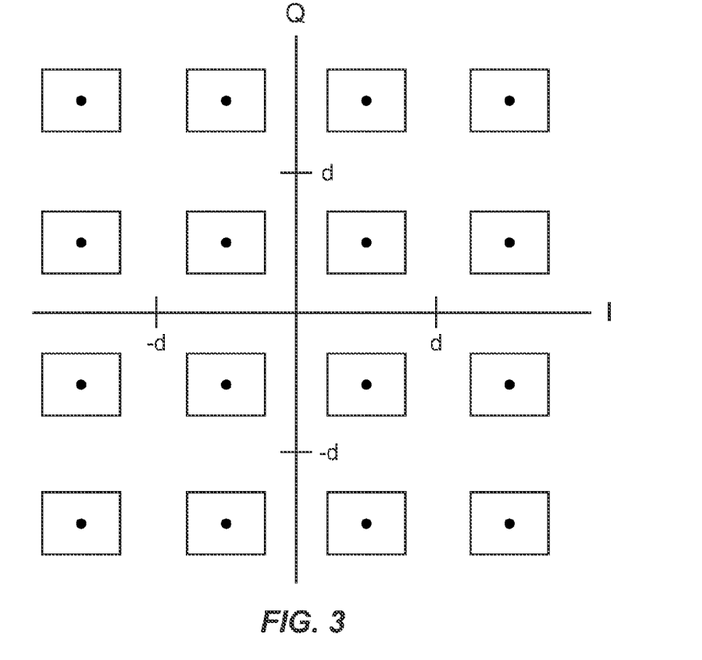
FIG. 3 illustrates the constellation pattern for 16QAM modulation.

The average estimated amplitude for the received despread symbols can be used to scale (i.e., normalize) individual despread symbols to a nominal constellation pattern for a given modulation scheme. FIG. 2 and illustrate example constellation patterns for QPSK and 16QAM modulation, respectively, where the dark dots indicate the expected possible values for the received despread symbols.

Individual despread symbols samples are compared to the constellation patterns by first placing "windows" around each constellation point. These windows might be circles or squares around the constellation points, for example, as shown in FIGS. 2 and 3. The total area of these windows for each constellation map should be the same. Thus, as suggested by FIGS. 2 and 3, the area of each individual window will be smaller on the 16QAM map than on the QPSK map, for example. Next, for each constellation map, the fraction of despread symbols $z_k(i)$ that do not fall inside any window is computed. For HSDPA, then, we can define as $\mu_{mod,i}$, i=1, 2, 3 the above-computed fraction or ratio for an assumed QPSK, 16QAM, or 64QAM modulation, respectively.

Given the assumption that all of the channelization codes under consideration were transmitted using the same power and using the same modulation scheme, the smallest of the ratios $\mu_{mod,i}$ corresponds to the most likely modulation scheme for the tested samples. In some approaches, this smallest ratio can be used to determine the most likely combination of channelization codes and modulation schemes used for one or more interfering signal transmission, and is herein called a modulation-matching metric, denoted by $\mu_{mod}$. Alternatively, if a hypothesis for the modulation scheme has already been established, the value of $\mu_{mod,i}$ that corresponds to the hypothesized modulation scheme can be used to evaluate the likelihood that the hypothesis is correct.

It will be appreciated that the size of the windows, e.g., the squares or circles, could depend on the measured signal to noise ratio. Larger windows might be used if more noise is present. This is to get better discrimination power from the ratio between elements inside and outside of windows.

Another metric can be calculated to characterize how equal the power (equivalently, how equal the average amplitude) is for a given set of channelization codes. For the purposes of this disclosure, this metric will be called a "code-power consistency metric."

First, let $g_i$ denote a group of channelization codes, $k_{1,i}, \ldots, k_{N,i}$ and let $d^{(g_i)}$ be the average amplitude of despread data samples for the channelization codes in the set $g_i$. Here, each amplitude per channelization code could be computed as in Equation (1), for example.

Next, assume that the power is the same within each group $g_i$, and that there are i=1, ..., G groups. We would like to estimate how probable it is that the amplitude is the same for all of these groups. So, let $\bar{d}$ be the average of the $d^{(g_i)}$:

$$\bar{d} = \frac{1}{G}\sum_{i=1}^{G} d^{(g_i)}. \quad (2)$$

Then, define the vector $\bar{\mathbf{d}}$ as a G×1 vector where all elements equal $\bar{d}$, and define vector d as the vector whose element i equals $d^{(g_i)}$.

Now, let $\mu_{i,filt}$ be an averaged (i.e., filtered) value indicating the present best estimate as to whether 64QAM configuration was configured by higher layers for a particular UE over time. This value should be averaged over several scheduling occasions, e.g., about 20. At each occasion, if it is assumed (or estimated) that a transmission for a particular scheduling occasion is done with no 64QAM configuration, then $\mu_{i,filt}$ is updated using the value 0. Otherwise, $\mu_{i,filt}$ is updated using the value 0.

Next, define a metric function $f(\mu_{i,filt},i)$. For any given scheduling occasion, the code-power consistency metric is based in part on an assumed setting for the 64QAM configuration parameter, which, as discussed above, is not known to a receiver attempting to demodulate HS-PDSCH transmissions targeted to other UEs. The point of the metric function $f(\mu_{i,filt},i)$ is to penalize any selection (assumption) of 64QAM configuration other than the historical value, since this configuration should only change infrequently. One example of a suitable metric function is:

$$f(\mu_{i,filt},i)=100|\mu_{i,filt}-i|, \quad (3)$$

where the filtered value $\mu_{i,filt}$ is compared with the assumed present 64QAM configuration i, where i takes a value 1 if 64QAM configuration is currently assumed, and 0 otherwise.

Finally, the code-power consistency metric $\mu_{cc}$ can be computed as follows:

$$\mu_{cc}=\alpha\|d-\bar{d}\|+\beta \cdot f(\mu_{i,filt},i), \quad (4)$$

where i is the assumed present 64QAM configuration for this channelization code setup and $\alpha, \beta$ are empirically-derived weight factors that determine the relative weightings between the distance function for the present observation and the past assumptions for the QAM configuration, as reflected by the metric function $f(\mu_{i,filt},i)$. This expression includes a distance function ($\|d-\bar{d}\|$); any of several, such as the Euclidian metric, may be used. The normalized L1 norm, in particular, is suitable:

$$\|d-\bar{d}\| = \frac{1}{G}\sum_{i=1}^{G} |d^{(g_i)}-\bar{d}|. \quad (5)$$

A suitable value for both $\alpha, \beta$ is 0.5. These values can be adjusted, however, e.g., based on the results of empirical testing in various conditions or based on changes in the make-up of the metric function metric function $f(\mu_{i,filt},i)$ The smaller the code-power consistency metric, the more probable it is that the different sets of channelization codes under consideration actually use the same power. Accordingly, the code-power consistency metric described above can be used to evaluate the likelihood that a particular group of channelization codes is used for a HS-PDSCH transmission to a single UE. In fact, as discussed in detail below, the code-power consistency metric can be used along with the modulation-matching metric described earlier to determine the combination of channelization codes and modulation schemes that is most likely to have been used to transmit HS-PDSCH to a group of several neighbor UEs.

Figure 4:
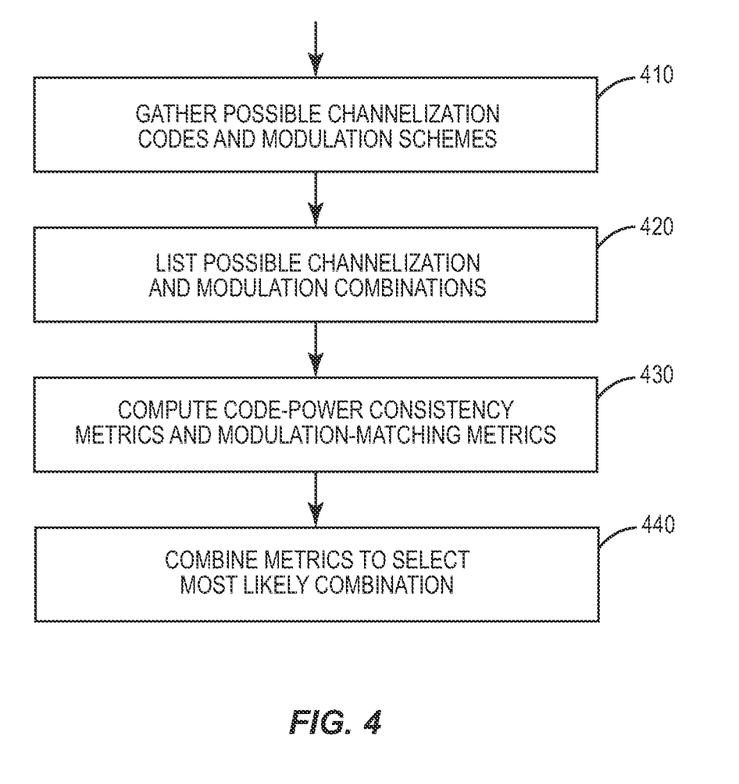
FIG. 4 is a process flow diagram illustrating an example method according to some embodiments of the present invention.

FIG. 4 illustrates a general approach that can be implemented in a receiver. First, it is assumed that the UE identifiers for one or more neighboring UEs that might be targeted by interfering transmissions are known. As shown at block 410, all of the possible channelization codes and modulation schemes used for interfering transmissions to each UE must be gathered. Because the identifiers for one or more neighboring UEs are known, it is possible to identify corresponding HS-SCCH messages transmitted from a given cell. Each of these HS-SCCH messages is then read to extract the possible modulation schemes and channelization codes for the corresponding UE. As discussed above, the interpretation of the HS-SCCH depends on whether the targeted UE has been configured for 64QAM operation. Thus, for every HS-SCCH there are two possible configurations of channelization code-set and modulation scheme for the targeted UE.

Next, as shown as block 420, all of the possible channelization and modulation combinations across all of the UEs are identified. If the assignment of channelization codes to UEs were completely independent, then there would be $2^n$ possible combinations here, since each UE's HS-SCCH message can be interpreted in two different ways. However, the allocations of channelization codes to the UEs are not independent. It is a fair assumption, for instance, that two different UEs will not use the same channelization codes. Therefore, not all possible combinations between channelization codes per UE are possible. Further, the receiver may have prior information about which channelization codes are empty or occupied by known transport channels, such as 3GPP Release 99 transport channels. This information can be used to remove possible combinations, as well. By ruling out impossible combinations, the number of hypotheses that must be evaluated can be reduced. These possible combinations can be indexed as i=1, ..., $N_{groups}$.

Amplitude-consistency and modulation-matching metrics are then computed for each of the possible combinations (i=1, ..., $N_{groups}$) of channelization codes and modulation schemes for all of the identified neighboring wireless terminals, as shown at block 430. One way to do this is to begin by taking a "cross-section" among all possible channelization code setups. This involves identifying the largest segments of channelization codes within all of the possible groupings such that within each segment it is certain that the modulation and transmitted power is the same. In other words, these segments of channelization codes are the largest possible groupings such that the codes within the group are not split between two or more neighboring wireless terminals.

If the largest known segments of like-modulation and like-power channelization codes are identified, the result will be a minimal set of channelization groups, each of which can be found in at least one possible allocation of channelization codes to wireless terminals, and none of which is split between wireless terminals in any possible combination. Let $g_i$ denote each such group of channelization codes where it is known that the transmit power and modulation is the same. We assume we have i=1, ..., G groups. A fair assumption is that only HS-PDSCH is transmitted on codes 1 to 15, that is, no other physical channels assumed on these codes. Thus, each of the possible combinations i=1, ..., $N_{groups}$ includes one or more of the groups $g_i$.

After the groups $g_i$ are identified, the modulation-matching metric $\mu_{mod}$ and code-power consistency metric $\mu_{cc}$ can be computed as follows for all combinations i=1, ..., $N_{groups}$. If, for a given combination, $\lfloor k_{j,1}, k_{j,2} \rfloor$ is the interval of channelization codes for a UE indexed by j, then let $\mu_{cc}(j)$ be the metric calculated using as input the groups $g_i$, which make up the interval $\lfloor k_{j,1}, k_{j,2} \rfloor$. Equations (2)-(5) may be used to calculate $\mu_{cc}(j)$, for example.

Similarly, $\mu_{mod}(j)$ is the modulation-matching metric for a UE indexed by j, calculated using as input the channelization codes in the interval $\lfloor k_{j,1}, k_{j,2} \rfloor$ for a given one of the possible combinations of channelization codes and modulation schemes. There are two possibilities for which value to use for the modulation-matching metric $\mu_{mod}(j)$. As discussed earlier, for a given group of channelization codes, a value $\mu_{mod,i}$ can be calculated for each of the possible modulation schemes (e.g., QPSK, 16QAM, 64QAM), i.e., for i=1, 2, or 3; these values each reflect a fraction of despread samples that fall outside defined windows centered on each constellation point for the given modulation scheme, and thus range between 0 and 1. The smallest of these values of $\mu_{mod,i}$ corresponds to the most likely modulation scheme for that group of channelization codes, and is used in the subsequent calculations in some embodiments of the invention.

In other embodiments, the modulation-matching metric $\mu_{mod,i}$ corresponding to the assumed modulation scheme for that wireless terminal is used, for a given possible combination of channelization codes and modulation schemes. It will be appreciated that the assumed modulation scheme for a given wireless terminal follows from the assumption as to whether 64QAM is configured or not for that wireless terminal, for the given possible combination of channelization codes and modulation schemes. This may differ from one possible combination to another. For example, given two neighboring terminals UE1 and UE2, a first possible combination of channelization codes and modulation schemes may be based on an interpretation of the HS-SCCH scheduling messages that assumes that 64QAM is configured for terminal UE1, but not for UE2. Another possible combination may be based on the assumption that 64QAM is configured for terminal UE2, but not for UE1. In each case, the interpretation of the HS-SCCH message for that terminal indicates a particular modulation scheme—the modulation-matching metric $\mu_{mod,i}$ corresponding to that assumed modulation scheme can then be used, in combination with corresponding metrics for other wireless terminals in the combination, to evaluate the likelihood of the combination as a whole.

Finally, the modulation-matching metrics and code-power consistency metrics are combined, as shown at block 440, to yield a combined metric that indicates the likelihood that each combination is the correct one. Thus, for each combination of channelization codes indexed by i=1, ..., $N_{groups}$, the metrics computed in the previous steps are combined, in a combination metric, $\mu_{comb}(i)$, as follows:

$$\mu_{comb}(i) = \alpha \sum_{j=1}^{N_{UE}} \mu_{mod}(j) + \beta \sum_{j=1}^{N_{UE}} \mu_{cc}(j). \quad (6)$$

Here, $N_{UE}$ is the number of detected UEs and $\alpha, \beta$ are weight factors, where $\alpha$ determines how much emphasis (weight) is placed on the modulation-matching metric and $\beta$ establishes the emphasis placed on the code-power consistency metrics. Suitable settings for $\alpha, \beta$ are 0.5, although adjustments to these parameters may be determined empirically. The combination i with the smallest $\mu_{comb}(i)$ value is said to be the correct combination of channelization codes and modulation for the UEs, i.e., the most likely combination used to address UEs in the vicinity of an interference-cancelling receiver.

Figure 5:
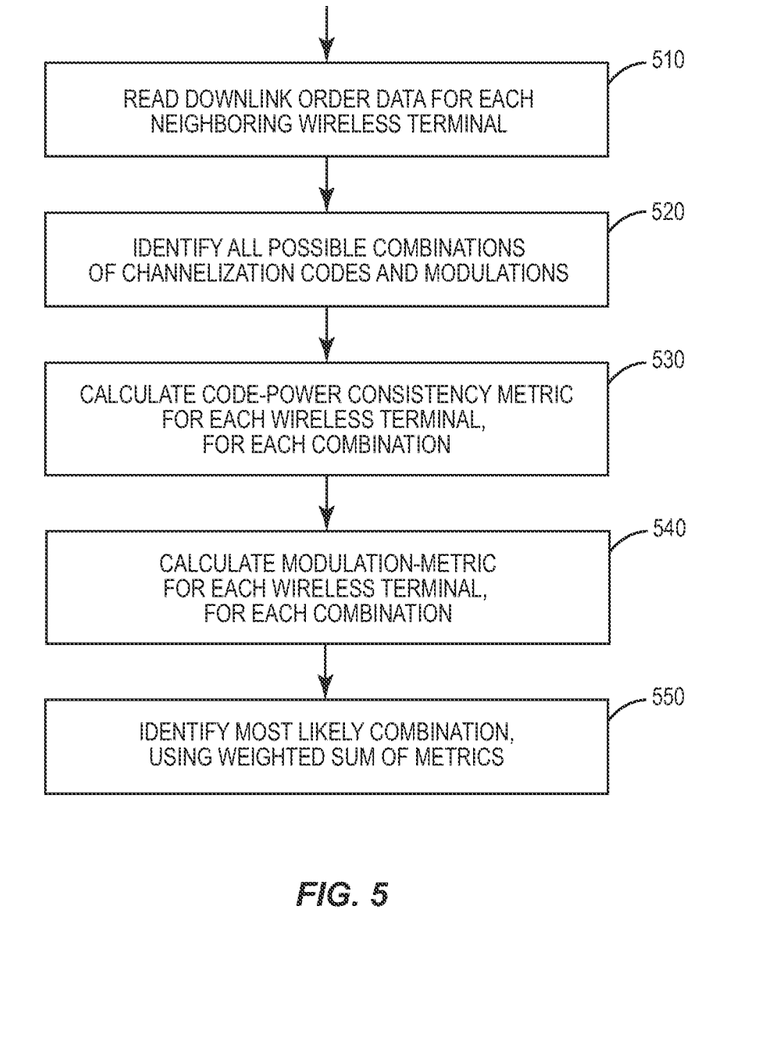
FIG. 5 is a process flow diagram illustrating another example method according to some embodiments of the present invention.

In the discussion above, detailed calculations are shown for identifying channelization codes and modulation schemes for interfering signals in an HSDPA system. It will be appreciated, however, that these techniques may be generalized to apply to other systems in which some, but not all, of the transmission format information for interfering signals can be determined from intercepting downlink control channel messages. FIG. 5 illustrates this more general approach for identifying channelization codes and modulation schemes for interfering signals targeted to neighboring wireless terminals.

As shown at block 510, the illustrated method begins with the reading of downlink order data for each of one or more neighboring wireless terminals from a downlink control channel. The downlink order data specifies an assignment of one or more channelization codes and a modulation scheme for the corresponding neighboring wireless terminal, where each assignment depending on the downlink order data and an unknown modulation configuration parameter previously sent to the corresponding neighboring wireless terminal. In an HSDPA system the downlink order data is read from an HS-SCCH scheduling message targeted to the neighboring wireless terminal and the unknown modulation configuration parameter is the 64QAM configuration status of the wireless terminal; as discussed earlier, this parameter is signaled via higher-layer control messages and is not readily accessible to an eavesdropping receiver.

Next, as shown at block 520, all possible combinations of channelization codes and modulation schemes for all of the neighboring wireless terminals are identified, taking into account possible values for the unknown modulation configuration parameter. In the HSDPA example, two possible interpretations for each downlink order data are possible, given the two possible 64QAM configuration states. The possible combinations of channelization codes and modulation schemes should also take into account that no two wireless terminals are assigned the same channelization codes. Thus, some combinations of interpretations of the downlink order for the various wireless terminals will result in code allocations that are not possible—these combinations can be eliminated from the set of possible hypotheses for wireless terminal/channelization-code/modulation-scheme arrangements.

For each possible combination of channelization codes and modulation schemes, a code-power consistency metric is then calculated for each of the neighboring wireless terminals, as shown at block 530. This code-power consistency metric indicates the probability that all of the channelization codes corresponding to the wireless terminal in a given combination are transmitted with the same power, and is based on despread data samples corresponding to the channelization codes for the respective wireless terminal, given the channelization code allocation for the combination under consideration. In some cases, the code-power consistency metric for each of the neighboring wireless terminals is further based on a filtered average of values for the unknown modulation configuration parameter determined from previous most likely combinations.

In some embodiments, the calculation of the code-power consistency metric for each of the neighboring wireless terminals for each possible combination of channelization codes and modulation schemes includes the following operations. First, a minimal set of channelization code groups is identified, based on the possible combinations of channelization codes and modulation schemes for all of the neighboring wireless terminals. Each of the channelization code groups in this minimal set consists of channelization codes that are not split between two or more neighboring wireless terminals in any of the possible combinations. Next, an average amplitude or power is calculated for each channelization code group, based on despread samples for the corresponding channelization codes. Then, for each of the possible combinations and for each neighboring wireless terminal in a given possible combination, the code-power consistency metric is computed, using a distance function that compares the average amplitudes or powers for each channelization code group for the neighboring wireless terminal to an average amplitude or power for all channelization code groups for the neighboring wireless terminal. Equations (3)-(5) above provide one example of how to calculate this code-power consistency metric. In that example, the code-power consistency metric is computed by calculating a weighted average of the distance function and a filtered average of values for the unknown modulation configuration parameter determined from previous most likely combinations.

Similarly, as shown at block 540, a modulation-matching metric is calculated for each of the neighboring wireless terminals, for each of the possible combinations. Again, this modulation-matching metric is based on received despread data samples corresponding to the channelization codes. The modulation-matching metric indicates how closely the received symbols match a constellation pattern for one of the possible modulation schemes. In the example calculation described in detail above, the modulation-matching metric for each of the neighboring wireless terminals for a given possible combination is calculated, for each neighboring wireless terminal and its corresponding channelization codes, by comparing despread samples for the corresponding channelization codes to an assumed map of constellation points and calculating a fraction of despread samples that fall outside defined windows centered on each constellation point. In some cases, the modulation-matching metric corresponds to the most likely modulation scheme for the wireless terminal, given a possible allocation of channelization codes. In other cases, however, the modulation-matching metric for each of the neighboring wireless terminals is calculated based on assumed modulation schemes for each of the neighboring wireless terminals, where the assumed modulation schemes are determined from the current assumed values for the unknown modulation configuration parameter.

Finally, a most likely one of the possible combinations of channelization codes and modulation schemes is identified, as shown at block 550. This is done using a weighted sum of the code-power consistency metrics and modulation-matching metrics for each possible combination. While an example weighting for an HSDPA system is suggested in the detailed discussion above, it will be appreciated that optimal weights for a given system and/or signal scenario may be determined through empirical testing and/or through system simulation.

The technique illustrated in FIG. 5 is of particular use in an interference-cancelling receiver, as the channelization code and modulation scheme information can be used to demodulate traffic data transmitted to the neighboring terminals, e.g., HSDPA transmissions in an HSDPA system. Accordingly, the operations illustrated in FIG. 5 may in some cases be followed by the forming of a reconstructed estimate of interfering signals corresponding to one or more of the neighboring wireless terminals, based on corresponding channelization codes and modulation schemes determined from the most likely one of the possible combinations. Interference cancellation can then be using the reconstructed estimate of the interfering signal.

The techniques described above and illustrated in FIGS. 3 and 4 can be implemented in a receiver circuit. More particularly, for example, a modulation configuration detection circuit can be configured to carry out one or more of these techniques. This modulation configuration detection circuit might be used, for example, to augment an interference-cancelling receiver, such as the receiver illustrated in FIG. 1, thus enabling the receiver to regenerate and cancel interfering signals targeted to neighboring wireless terminals.

Figure 6:
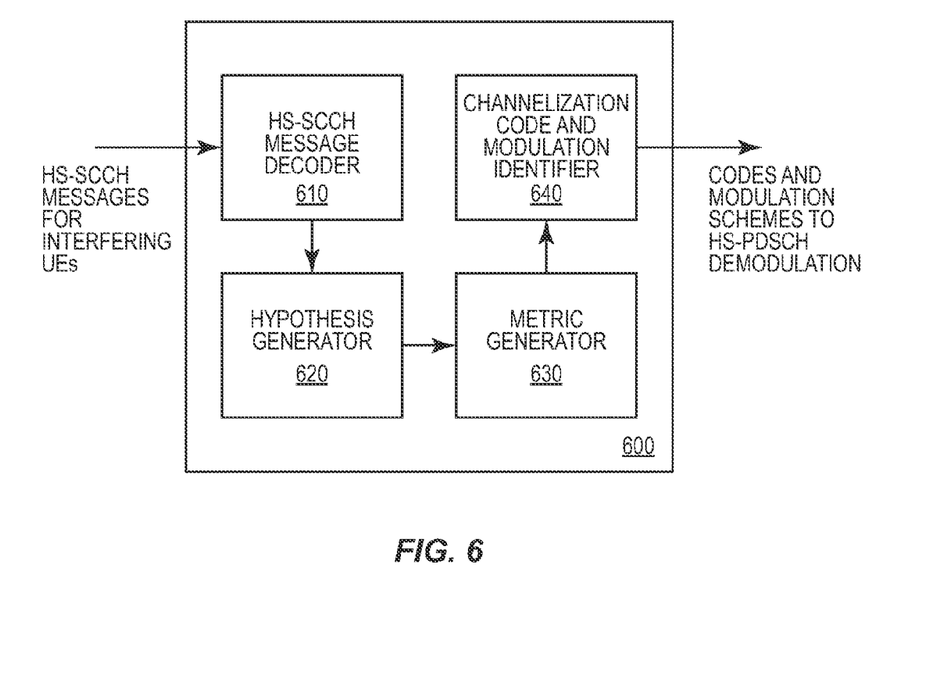
FIG. 6 is a block diagram illustrating functional components of a modulation configuration detection circuit according to some embodiments of the invention.

FIG. 6 illustrates functional components of an example modulation configuration detection circuit 600 adapted for HSDPA operation. A similar circuit could be applied to other wireless system contexts.

Circuit 600 includes an HS-SCCH message decoder 610, which reads and interprets downlink assignment messages for neighboring wireless terminals. As discussed in detail above, the downlink order data included in these messages specify an assignment of one or more channelization codes and a modulation scheme for the targeted wireless terminal, but the proper interpretation of the order data depends on whether or not the wireless terminal is configured for 64QAM operation, which is normally unknown to other receivers.

Circuit 600 further includes a hypothesis generator 620, which identifies all possible combinations of channelization codes and modulation schemes for all of the neighboring wireless terminals, taking into account possible values for the unknown modulation configuration parameter and that no two wireless terminals are assigned the same channelization codes. Metric generator 630 calculates two metrics for each of the neighboring wireless terminals, for each possible combination: a code-power consistency metric and a modulation-matching metric. These metrics are based on despread data samples corresponding to the channelization codes for each wireless terminal, for each possible combination of channelization code and modulation scheme allocations. Detailed examples of these calculations were given above.

Finally, channelization code and modulation identifier 640 identifies a most likely one of the possible combinations, using a weighted sum of the code-power consistency metrics and modulation-matching metrics for each possible combination. This information is supplied to demodulation circuits so that the corresponding HS-PDSCH transmissions to the neighboring wireless terminals can be demodulated, regenerated, and cancelled from the received signal.

As will be readily understood by those familiar with communications receiver design, the several functional blocks of circuit 600, as well as one or more functions from other receiver circuits may be implemented using digital logic and/or one or more microcontrollers, microprocessors, or other digital hardware. In some embodiments, several or all of the various functions of receiver circuit 600 may be implemented together, such as in a single application-specific integrated circuit (ASIC), or in two or more separate devices with appropriate hardware and/or software interfaces between them. Several of the functional blocks of receiver circuit 600 may be implemented on a processor shared with other functional components of a wireless terminal, for example, such as one or more of the components illustrated in FIG. 1.

Alternatively, several of the functional elements of the receiver processing circuits discussed above may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory.

Other hardware, conventional and/or custom, may also be included. Designers of communications receivers will appreciate the cost, performance, and maintenance tradeoffs inherent in these design choices.

Figure 7:
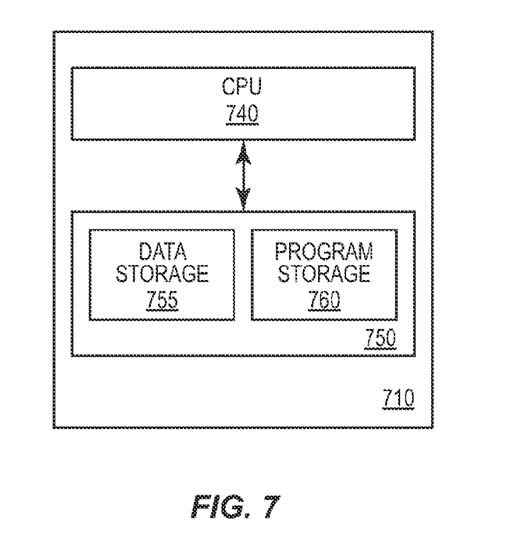
FIG. 7 illustrates an example processing circuit.

FIG. 7 illustrates one example of a processing circuit 710 adapted to carry out the functions of one or more of the functional blocks of receiver circuit 600. Processing circuit 710 includes a central-processing unit (CPU) 740, which may comprise one or more microprocessors, microcontrollers, and/or the like, coupled to memory unit 750. Memory unit 750, which may comprise one or several types of memory such as RAM, ROM, Flash, optical storage devices, magnetic storage devices, and the like, stores computer program instructions 760 for execution by CPU 740, and stores program data 755. Program instructions 760 include instructions for carrying out one or more of the techniques described above. In particular, program instructions 760 may include, in several embodiments, computer program instructions for identifying channelization codes and modulation schemes for interfering signals targeted to neighboring wireless terminals, using one of the detailed techniques described above or variants thereof.

The processing circuit 710 of FIG. 7 may be further configured, in some embodiments, to carry out some or all of the functions of one or more of the other functional blocks of FIG. 1, such as decoder 140, soft mapper 150, signal regenerator 160, and so on. In some cases some or all of these functions may be carried out on separate processing circuits, which may or may not have similar structures. It will be appreciated, of course, that several of the functions of receiver circuit 100 may be better suited for implementation in specialized digital hardware. For example, hardware implementations of high-speed correlator arrays suitable for implementing RAKE despreader 110 are well known.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the present invention is limited only by the following claims and their legal equivalents.

What is claimed is:

1. A method, in a first wireless terminal, for identifying channelization codes and modulation schemes for interfering signals targeted to neighboring wireless terminals, the method comprising:
for each of one or more neighboring wireless terminals, reading corresponding downlink order data from a downlink control channel, the downlink order data specifying an assignment of one or more channelization codes and a modulation scheme for the corresponding neighboring wireless terminal, each assignment depending on the downlink order data and an unknown modulation configuration parameter previously sent to the corresponding neighboring wireless terminal;
identifying all possible combinations of channelization codes and modulation schemes for all of the neighboring wireless terminals, taking into account possible values for the unknown modulation configuration parameter or parameters and that no two wireless terminals are assigned the same channelization codes;
for each possible combination, calculating a code-power consistency metric for each of the neighboring wireless terminals, based on despread data samples corresponding to the channelization codes of the possible combination;
for each possible combination, calculating a modulation-matching metric for each of the neighboring wireless terminals, based on received despread data samples corresponding to the channelization codes of the possible combination; and
identifying a most likely one of the possible combinations, using a weighted sum of the code-power consistency metrics and modulation-matching metrics for each possible combination.

2. The method of claim 1, wherein the downlink control channel is a High-Speed Shared Control Channel (HS-SCCH) in a High-Speed Downlink Packet Access (HSDPA) system, and wherein the unknown modulation configuration parameter for each of the neighboring wireless terminals is a 64-QAM configuration parameter.

3. The method of claim 1, further comprising:
forming a reconstructed estimate of interfering signals corresponding to one or more of the neighboring wireless terminals, based on corresponding channelization codes and modulation schemes determined from the most likely one of the possible combinations; and
performing interference cancellation using the reconstructed estimate.

4. The method of claim 1, wherein at least the code-power consistency metric for each of the neighboring wireless terminals is further based on a filtered average of values for the unknown modulation configuration parameter determined from previous most likely combinations.

5. The method of claim 1, wherein calculating the modulation-matching metric for each of the neighboring wireless terminals is based further on assumed modulation schemes for each of the neighboring wireless terminals, wherein the assumed modulation schemes are determined from the current assumed values for the unknown modulation configuration parameter.

6. The method of claim 1, wherein calculating the modulation-matching metric for each of the neighboring wireless terminals for a given possible combination comprises, for each neighboring wireless terminal and its corresponding channelization codes, comparing despread samples for the corresponding channelization codes to an assumed map of constellation points and calculating a fraction of despread samples that fall outside defined windows centered on each constellation point.

7. The method of claim 1, wherein calculating a code-power consistency metric for each of the neighboring wireless terminals for each possible combination comprises:
identifying a minimal set of channelization code groups based on the possible combinations of channelization codes and modulation schemes for all of the neighboring wireless terminals, each channelization code group consisting of channelization codes that are not split between two or more neighboring wireless terminals in any of the possible combinations;
calculating an average amplitude or power for each channelization code group, based on despread samples for the corresponding channelization codes; and
for each of the possible combinations and for each neighboring wireless terminal in a given possible combination, calculating the code-power consistency metric using a distance function that compares the average amplitudes or powers for each channelization code group for the neighboring wireless terminal to an average amplitude or power for all channelization code groups for the neighboring wireless terminal.

8. The method of claim 7, wherein said distance function is given by $$\frac{1}{G}\sum_{i=1}^{G} |d^{(g_i)} - \overline{d}|,$$

where G is the number of channelization code groups for the neighboring wireless terminal, $d^{(g_i)}$ is the average amplitude or power for channelization code group $g_i$, and $\overline{d}$ is the average amplitude or power for all channelization code groups for the neighboring wireless terminal.

9. The method of claim 7, wherein calculating the code-power consistency metric comprises calculating a weighted average of the distance function and a filtered average of values for the unknown modulation configuration parameter determined from previous most likely combinations.

10. A receiver circuit configured to identify channelization codes and modulation schemes for interfering signals targeted to neighboring wireless terminals, the receiver circuit comprising:
   a despreading circuit configured to generate despread data samples for each of a plurality of channelization codes;
   a demodulation and decoder circuit configured to decode downlink order data from a downlink control channel, for each of one or more neighboring wireless terminals; and
   a processing circuit configured to:
      for each of the one or more neighboring wireless terminals, read the corresponding downlink order data, the downlink order data specifying an assignment of one or more channelization codes and a modulation scheme for the corresponding neighboring wireless terminal, each assignment depending on the downlink order data and an unknown modulation configuration parameter previously sent to the corresponding neighboring wireless terminal;
      identify all possible combinations of channelization codes and modulation schemes for all of the neighboring wireless terminals, taking into account possible values for the unknown modulation configuration parameter or parameters and that no two wireless terminals are assigned the same channelization codes;
      calculate a code-power consistency metric for each of the neighboring wireless terminals, for each possible combination, based on despread data samples corresponding to the channelization codes of the possible combination;
      calculate a modulation-matching metric for each of the neighboring wireless terminals, for each possible combination, based on received despread data samples corresponding to the channelization codes of the possible combination; and
      identify a most likely one of the possible combinations, using a weighted sum of the code-power consistency metrics and modulation-matching metrics for each possible combination.

11. The receiver circuit of claim 10, wherein the downlink control channel is a High-Speed Shared Control Channel (HS-SCCH) in a High-Speed Downlink Packet Access (HSDPA) system, and wherein the unknown modulation configuration parameter for each of the neighboring wireless terminals is a 64-QAM configuration parameter.

12. The receiver circuit of claim 10, further comprising:
   a signal regeneration circuit configured to form a reconstructed estimate of interfering signals corresponding to one or more of the neighboring wireless terminals, based on corresponding channelization codes and modulation schemes determined from the most likely one of the possible combinations; and
   a signal subtraction circuit configured to perform interference cancellation using the reconstructed estimate.

13. The receiver circuit of claim 10, wherein the processing circuit is configured to calculate the code-power consistency metric for each of the neighboring wireless terminals based further on a filtered average of values for the unknown modulation configuration parameter determined from previous most likely combinations.

14. The receiver circuit of claim 10, wherein the processing circuit is configured to calculate the modulation-matching metric for each of the neighboring wireless terminals based further on assumed modulation schemes for each of the neighboring wireless terminals, wherein the assumed modulation schemes are determined from the current assumed values for the unknown modulation configuration parameter.

15. The receiver circuit of claim 10, wherein the processing circuit is configured to calculate the modulation-matching metric for each of the neighboring wireless terminals for a given possible combination by, for each neighboring wireless terminal and its corresponding channelization codes, comparing despread samples for the corresponding channelization codes to an assumed map of constellation points and calculating a fraction of despread samples that fall outside defined windows centered on each constellation point.

16. The receiver circuit of claim 10, wherein the processing circuit is configured to calculate a code-power consistency metric for each of the neighboring wireless terminals for each possible combination by:
   identifying a minimal set of channelization code groups based on the possible combinations of channelization codes and modulation schemes for all of the neighboring wireless terminals, each channelization code group consisting of channelization codes that are not split between two or more neighboring wireless terminals in any of the possible combinations;
   calculating an average amplitude or power for each channelization code group, based on despread samples for the corresponding channelization codes; and
   for each of the possible combinations and for each neighboring wireless terminal in a given possible combination, calculating the code-power consistency metric using a distance function that compares the average amplitudes or powers for each channelization code group for the neighboring wireless terminal to an average amplitude or power for all channelization code groups for the neighboring wireless terminal.

17. The receiver circuit of claim 16, wherein said distance function is given by $$\frac{1}{G}\sum_{i=1}^{G} |d^{(g_i)} - \overline{d}|,$$

where G is the number of channelization code groups for the neighboring wireless terminal, $d^{(g_i)}$ is the average amplitude or power for channelization code group $g_i$, and $\overline{d}$ is the average amplitude or power for all channelization code groups for the neighboring wireless terminal.

18. The receiver circuit of claim 16, wherein the processing circuit is configured to calculate the code-power consistency metric by calculating a weighted average of the distance function and a filtered average of values for the unknown modulation configuration parameter determined from previous most likely combinations.

* * * * *